United States Patent [19]

Colanzi et al.

[11] Patent Number: 4,460,184
[45] Date of Patent: Jul. 17, 1984

[54] SEAL ASSEMBLY COMPRISING TWO LIPS, ONE OF WHICH IS AXIAL AND THE OTHER RADIAL, AND A LABYRINTH

[75] Inventors: Franco Colanzi; Angelo Vignotto, both of Turin, Italy

[73] Assignee: RIV-SKF Officine di Villar Perosa S.p.A., Turin, Italy

[21] Appl. No.: 364,266

[22] Filed: Apr. 1, 1982

[30] Foreign Application Priority Data

Apr. 15, 1981 [IT] Italy .................. 53143/81[U]

[51] Int. Cl.³ .................. F16J 15/32; F16J 15/34
[52] U.S. Cl. .................. 277/35; 277/153
[58] Field of Search .......... 277/152, 153, 53, 35, 277/36, 37, 82, 83, 92

[56] References Cited

U.S. PATENT DOCUMENTS

Re. 31,058 10/1982 Povejsil .................. 277/153

3,561,770 2/1971 Corsi .................. 277/35

Primary Examiner—Robert I. Smith
Attorney, Agent, or Firm—Shlesinger, Arkwright, Garvey & Fado

[57] ABSTRACT

A seal assembly apt to be interposed between two members movable relative to one another, in order to provide a seal between a cavity situated between the two members and the external ambient surrounding said cavity, having a first and a second annular elements apt to be mounted on the said members, in which a third deformable annular element rigidly connected to said second element is provided with an annular lip and with an annular projection extending in a radial direction and substantially perpendicular to the lip, arranged to slide with a predetermined pressure on a first and a second surface of the said first element under the action of a resilient element housed in a seating of the third element.

9 Claims, 2 Drawing Figures

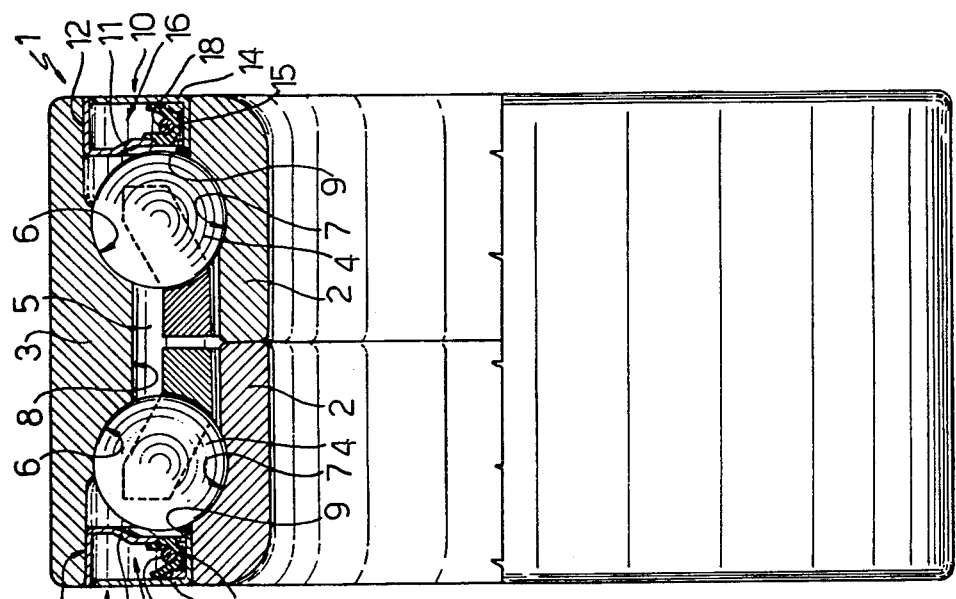
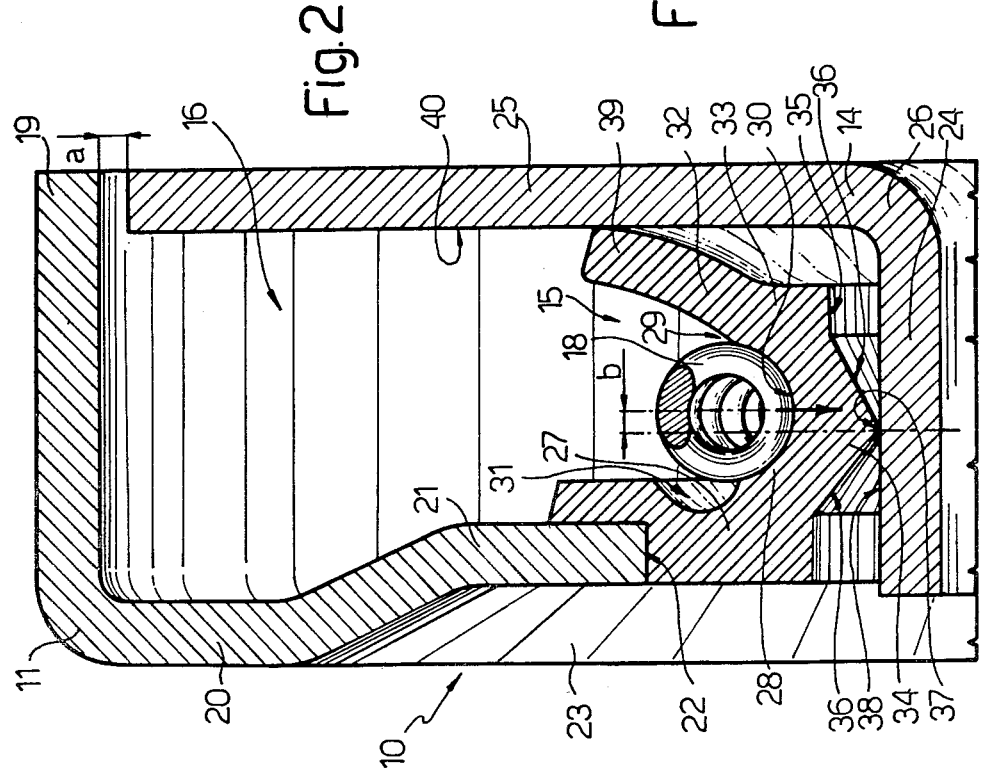

SEAL ASSEMBLY COMPRISING TWO LIPS, ONE OF WHICH IS AXIAL AND THE OTHER RADIAL, AND A LABYRINTH

BACKGROUND OF THE INVENTION

The present invention relates to a seal assembly apt to be interposed between two elements movable relative to one another, and more particularly, but not exclusively, to a seal assembly apt to be interposed between the outer and the inner race of a rolling bearing, and particularly to a seal assembly of the type with two lips.

It is known that there are many types of seal assemblies apt to be interposed between the races of a rolling bearing in order to insulate the cavity, comprised between the races themselves, in which there are housed the rolling bodies, from the surrounding ambient, so as to avoid leaks of lubricant or the entry of contaminating agents, such as water and dust, into the cavity itself.

Among these assemblies, the most common is a seal assembly comprising a metal ring suitably shaped in such a manner as to couple by light drive fit with a special seating formed in the outer race of the rolling bearing, and a resilient annular lip of elastomeric material, connected in any suitable way to the said metal ring and arranged to slide under a predetermined pressure on a special surface formed on the inner race of the bearing so as to create with this surface a sliding seal.

There are known also seal assemblies of the type with two lips, which comprise a suitably shaped metal ring arranged to couple by light drive fit with the outer race of the bearing, and a second ring, made of an elastomeric material, provided with two radial lips arranged to slide under a predetermined pressure on the outer surface of the inner race so as to provide said surface a sliding seal both in respect of the outer agents which tend to enter the said cavity and in respect of the lubricant which tends to come out therefrom.

Finally, a further known type of seal assembly comprises a suitably shaped ring, made of an elastomeric material, which is arranged to be inserted by drive into a special seating of the outer ring and provide a sliding seal on the inner race by means of a deformable projection pushed under a predetermined pressure against the outer surface of the inner race by an elastic metal member fixed on the ring of elastomeric material.

The seal assemblies mentioned hereinabove are not exempt from disadvantages. In particular, the seal assemblies of the type with two lips often have large overall dimensions which are unacceptable in applications relating to rolling bearings. The seal assemblies with a single lip have limited overall dimensions, but a poor sealing efficiency, inasmuch as they are able to prevent the passage in only one direction (from the outside to the inside of the chamber which they protect, or viceversa) because an eventual pressure in a direction oposite to that of the pressure to which they are subjected in use is able to raise the sealing lips and thus nullify their action. Finally, even the seal assemblies provided with a metal elastic member, though eliminating in part the disadvantages mentioned hereinabove, have a poor efficiency owing to the presence of a single and limited annular contact region between the deformable projection and the surface on which this projection slides.

SUMMARY OF THE INVENTION

The object of the present invention is to provide a seal assembly of the type described hereinabove, which will be free from the described disadvantages and in particular will be able to ensure an efficient seal in order to prevent both the lubricant from flowing out from the chamber which the assembly protects and contaminant agents from entering said chamber, and will have limited overall dimensions.

Within the scope of the present invention there is provided a seal assembly adopted to be interposed between two members movable relative to one another, in order to provide a seal between a cavity comprised between said members and the outer ambient surrounding said cavity, comprising a first and a second annular element, each of which is adopted to be mounted on one of said members and rigidly connected thereto, the first of said annular elements being provided with at least a first and a second sliding surface substantially perpendicular to one another, characterized in comprising a third annular element made of a soft and resilient material and rigidly connected to said second annular element, and a resilient element housed in an annular seating formed in the said third annular element, this third annular element having a deformable annular projection apt to slide on said first sliding surface and a deformable annular lip extending in a direction substantially perpendicular to said deformable projection and apt to slide on said second surface, the said resilient element being apt to push with a predetermined pressure the said projection and the said lip against said first and second sliding surface, respectively.

BRIEF DESCRIPTION OF THE DRAWINGS

For a better understanding of the present invention an embodiment thereof will now be described in detail, by way of a non limiting example, with reference to the annexed drawings, in which:

FIG. 1 shows a rolling bearing with two rows of balls, having mounted thereon a seal assembly according to the teachings of the present invention, and FIG. 2 is an enlarged radial section of the seal assembly shown in FIG. 1.

DETAILED DESCRIPTION OF THE INVENTION

Referring now to FIG. 1, reference numeral 1 indicates generally a rolling bearing comprising two symmetrical inner races 2 facing one another, an outer race 3 and two rows of ball bearings 4 housed in a cavity 5 situated between the outer race 3 and the inner races 2. The ball bearings 4 roll in paths 6 and 7 formed, respectively, on an inner surface 8 of the outer race 3 and on an outer surface 9 of the inner races 2, and the cavity 5 is closed at its ends by seal assemblies 10 interposed between the inner races 2 and the outer race 3.

Referring now also to FIG. 2, each seal assembly 10 comrpises a first annular element 11 housed with light drive fit in a seating 12 formed in the surface 8 of the outer race 3, a second annular element 14 keyed with light drive fit onto the outer surface 9 of each inner race 2, a sealing ring 15 rigidly connected to the element 11 and housed in a cavity formed between the two elements 11 and 14, and a resilient element 18 mounted on the sealing ring 15.

Element 11 is preferably made of metal but can be made of a rigid material of high strength, and is substantially cup-shaped having a sidewall 19 parallel to the axis of the element 11 and arranged to couple with the seating 12 and a bottom wall 20 substantially perpendicular to the sidewall 19 and having recessed area 21 turned towards the cavity 16 and formed coaxially with a central hole 22 of the wall 20. In this way, the wall 20, which results in being turned towards the ball bearings 4 when the element 11 is mounted in the seating 12, has, in a location corresponding to the recessed area 21, a shallow 23 facing the inclined circular section ball bearings 4 which permits deduction of the axial dimensions of the seal assembly 10, especially in the case in which, as shown in FIG. 1, the bodies 4 are formed by balls.

The annular element 14 also is preferably made of a metal of a rigid material of high strength and has a sleeve-shaped portion 24 of suitable thickness, which engages one of the inner races 2, and a flange portion 25 extending perpendicularly to said sleeve-shaped portion from curved section 28 and having an outer diameter such as to leave between itself and the sidewall 19 of the annular element 11, after assembly, a predetermined annular clearance a as shown in FIG. 2. The two annular elements 11 and 14 are coaxially disposed with respect to each other.

The sealing ring 15, is made of a deformable, soft and resilient material, such as an elastomeric material, rubber or synthetic plastic resin, and is joined with the annular element 11 in the vicinity of its central hole 11 in any convenient way, for example by curing or by glueing or welding. The ring 15 also has a flange portion 27, by means of which it is joined with the annular element 11, and a sleeve-shaped portion 28, substantially perpendicular to the former, on an outer surface 29 of which there is formed an annular seating section 30 for receiving the resilient element 18 which is formed by a circular spiral spring on the sleeve-shaped portion 28 so as to exert onto this latter a force substantially perpendicular to the axis of the ring 15. Near the resilient element 18 the flange portion 27 has also an annular space 31 facing the element 18 itself, so as to facilitate the introduction of this latter into the seating section 30. The sleeve-shaped portion 28 of the ring 15, after the assemblage has been accomplished, results in being coaxial with the sleeve-shaped portion 24 of the annular element 14 and situated outside thereof, and is provided with a deformable annular lip 32 formed integrally with the ring 15 near an end 33 of the sleeve-shaped portion 28, and with an annular connecting section 34 extending in a radial direction substantially perpendicular to the lip 32 and formed integrally with the ring 15 on an inner surface 35 of the sleeve-shaped portion 28. The annular central section 34 is has an outer surface with two oblique walls 36 and has an apex 37 adapted to slide on an outer surface 38 of the sleeve-shaped portion 24 against which it rests after the assemblage has been accomplished. The annular lip 32 extends with a predetermined, but slight inclination in a direction substantially parallel to the axis of symmetry of the ring 15 and has its free end arranged to slide on a durface 40, turned towards the cavity 16, of the flange-shaped portion 25 of the element 14, against which the end 39 rests after the assemblage has been accomplished. Therefore, the surfaces 38 and 40 result in being substantially perpendicular to one another.

The apex 37 of the central connecting apex section 34 results in being axially offset relative to the point of application of the resilient force exerted by the element 18 perpendicularly to the axis of the ring 15 inasmuch as the axis passing through the apex 37 results in being offset relative to the axis of symmetry of the helical winding of the spring 18 by a predetermined distance measured along the axis of symmetry of the ring 15 and indicated by b (FIG. 2). In this way, the spring 18 deforms more of the end 32 of the sleeve-shaped portion 28 pushing simultaneously, with a predetermined pressure on the apex 37 of the central connecting section 34 against the surface 38 and the end 39 of the lip 32 against the surface 40, inasmuch as onto the lip 32 there is exerted a moment due to the misalignment between the force acting onto the projection 34, indicated by an arrow in FIG. 2, and the fulcrum formed by the bearing point of the apex 37 on the surface 38.

In use, the seal assembly 10 is mounted between two members movable relative to one another, such as for example the races 2 and 3 of the bearing 1 shown in FIG. 1, by first positioning the element 11 into the annular seating section 12 and then mounting the element 14 in such a manner that flange-shaped portion 25 will result in being flush with the outer edge of the sidewall 19. In this way, the lip 32 and the projection 34 come into contact, by deforming, with the surfaces 40 and 38, respectively, against which they are pushed with a predetermined pressure by the action of the spring 18, thus providing a double seal as regards both the external contaminants (lip 32) and the lubricant contained in the cavity 5 (projection 34). Moreover, the two sliding seals are provided, respectively, the first in an axial direction and the second in a radial direction relative to the axis of symmetry of the assembly 10 and are exerted on surfaces (40, 38) which are worked and treated especially. The cavity 16 and above all the limited annular clearance a between the wall 19 and the portion 25 exert also the function of a labyrinth and hence a sealing action in respect both of eventual leaks of lubricant and eventual external contaminants which tend to remain in the chamber 16. Moreover, the space between lip 32, projection 34 and element 14 may be filled with grease in order to enhance the sealing action and to lubricate the sliding seals. In addition, in the case in which the element 14 is mounted on a rotating member it exerts by its flange portion 25 a centrifugation action on the external contaminants.

The advantages of the present invention are apparent from the foregoing description. In particular, the present invention allows to provide seal assemblies which exert a simultaneous and equally efficient action both in respect of any lubricant tending to leak and in respect of external contaminants, with limited axial dimensions, because of the position of the sliding seals. In addition, the sliding seal actions are carried out one in a radial direction and the other in an axial direction and both of them are exerted beacuse of the action of a resilient element and to the elastic tension due to the deformation of the sealing ring as a result of the assemblage, thus providing a very efficient seal which cannot be affected by eventual vibrations or displacements or pressures due to particularly difficult operation conditions. Furthermore, thanks to the misalignment of the resilient element relative to the sliding seals, this element is apt to exert its action on both sliding seals simultaneously, with considerable constructive simplifications and reductions of the overall dimensions. Should the resilient element become uncoupled and come out from its seating, the sealing action would not fail, since the sliding seals still remain subjected to a residual pressure due to the elastic deformation produced by the assemblage and also because of the labyrinth action generated by the presence of the limited annular clearance and the chamber situated between the rigid annular elements, which chamber, in addition, retains the spring in its interior, thus avoiding possible damages to the ball bearings of the bearing.

From the foregoing it also appears clearly that variations and modifications can be made to the seal assembly of the present invention, without departing from the scope of the invention. In particular, the seal assembly of the present invention can be interposed between any pair of members movable relative to one another, such as for example a rotating shaft and the support casing of the respective bearings. In this latter case, the annular elements 11 and 14 can be fixed not only by drive fit, but also in any other suitable way, for example by means suitable fastening parts or members, such as resilient rings, ring nuts, shoulders and the like.

We claim:

1. A seal assembly (10) adapted to be interposed between two axially-spaced concentrically-disposed annular members (2,3) movable relative to one another, in order to provide a seal between an internal cavity (5) between said annular members (2,3) and the outer area surrounding said cavity (5), comprising a first inner annular ring element (14) and a second annular ring (11), each of which is adapted to be mounted on a different one of said annular members (2,3) and rigidly connected to the first and second said annular elements (11,14) respectively, one of the annular elements being provided with a first (38) and second (40) internal sliding surfaces which are substantially perpendicular to each other, and a third annular sliding element (15) made of a soft and resilient material rigidly connected to said second annular element (11), and the resilient element (18) housed in an annular seating (3) formed in the said third annular element (15) on its internal surface, this third annular element (15) having a deformable external annular fulcrum section (34) adapted to slide on said first sliding surface (38) and a deformable annular lip (32) extending in a direction substantially perpendicular to said deformable projection (34) and adapted to slide on said second surface (40), the said resilient element (18) being positioned in the annular seating (30) which is offset from alignment with the projection (37) toward the annular lip (32) such that the said resilient element (18) is adapted to push with a predetermined downward pressure on the said projection (37) and also outwardly with lateral pressure on the said lip (32) to thereby press them into firm sliding sealing contact against said first and second sliding surfaces (38,40).

2. A seal assembly (10) as claimed in claim 1, characterized in that the said resilient element (18) is a spiral spring wound like a ring around a sleeve-shaped portion (28) of said third annular element (15), on an outer surface (29) of said sleeve-shaped portion (28) there being formed the said annular seating (30).

3. A seal assembly (10) as claimed in claim 1 characterized in that the said resilient element (18) is mounted on said sleeve-shaped portion (28) in a position axially offset relative to the apex (37) of the said annular projection (34), the said apex (37) being in contact with said first surface (38) and the said resilient element (18) exerting onto said lip (32) a moment proportional to the distance, measured along the axis of symmetry of said third annular element (15), comprised between the said apex (37) of said annulat projection (34) and the action straight line of the force exerted by said resilient element (18) perpendicularly to said axis of symmetry.

4. A seal assembly (10) as claimed in claim 1, characterized in that said third annular element (15) comprises a flange-shaped portion (27), rigidly connected to the said second annular element (11), and the said sleeve-shaped portion (28), on an inner surface (35) of this latter there being formed, in a direction substantially radial relative to the said axis of symmetry, the said annular projection (34), and in an end (33) of the said sleeve-shaped portion (28) there being formed, in a direction substantially parallel to said axis of symmetry and with a predetermined inclination relative to this latter, the said annular lip (32).

5. A seal assembly (10) as claimed in claim 1, characterized in that between said first and second annular elements (14, 11) there is comprised a space (16) in which the said third annular element (15) and the said resilient element (28) are disposed, a predetermined annular clearance (a) being comprised between a sidewall (19) of said second element (17) and a flange-shaped portion (25) of said first element (14), the said clearance (a) and the said space (16) forming a labyrinth seal.

6. A seal assembly (10) as claimed in claim 1, characterized in that said first annular element (14) is keyed on a rotating member (2), the said flange-shaped portion (25) of said first element (14) being apt to exert a centrifugation action on contamination agents external to said cavity (5).

7. A seal assembly (10) as claimed in claim 1, characterized in that the said third element (15) is made of an elastomeric material.

8. A seal assembly (10) as claimed in claim 1, characterized in that the said third element (15) is made of a synthetic plastic resin.

9. A seal assembly (10) as claimed in claim 1, characterized in that said first element (14) and said second element (11) are made of metal.

* * * * *